US012704434B2

(12) United States Patent
Liu

(10) Patent No.: US 12,704,434 B2
(45) Date of Patent: Aug. 11, 2026

(54) OPTICAL DEVICE FOR TESTING AN IMAGE SENSOR

(71) Applicant: OmniVision Technologies, Inc., Santa Clara, CA (US)

(72) Inventor: Hung Wei Liu, Hsinchu City (TW)

(73) Assignee: OMNIVISION TECHNOLOGIES, INC., Santa Clara, CA (US)

( * ) Notice: Subject to any disclaimer, the term of this patent is extended or adjusted under 35 U.S.C. 154(b) by 93 days.

(21) Appl. No.: 18/772,462

(22) Filed: Jul. 15, 2024

(65) Prior Publication Data

US 2026/0016367 A1 Jan. 15, 2026

(51) Int. Cl.
*G01M 11/02* (2006.01)

(52) U.S. Cl.
CPC .... *G01M 11/0221* (2013.01); *G01M 11/0207* (2013.01); *G01M 11/0242* (2013.01)

(58) Field of Classification Search
CPC ......... G01M 11/0221; G01M 11/0207; G01M 11/0242
See application file for complete search history.

(56) References Cited

U.S. PATENT DOCUMENTS 5,844,670 A * 12/1998 Morita ................. G01M 11/025 356/127
6,141,100 A * 10/2000 Burka .................. G01N 21/552 356/451
6,388,821 B1 * 5/2002 Dehmlow ............. G02B 13/22 359/716
2025/0147403 A1 * 5/2025 Ishikawa ................ G03B 35/08

* cited by examiner

*Primary Examiner* — Hina F Ayub
(74) *Attorney, Agent, or Firm* — MUNCY, GEISSLER, OLDS & LOWE, P.C.

(57) ABSTRACT

An optical device includes a first lens group arranged between a light-passing module and an object side. A second lens group is arranged between the light-passing and an image sensor. The light-passing control module is disposed between the first lens group and the second lens group, and is configured to control amount of light incident based on a chief ray angle. The light-passing control module includes an aperture stop. The position of the aperture stop is adjustable along the optical axis of the optical device. Alternatively, the aperture stop is disposed inside a rotating bezel. The chief ray angle of the optical device is changed by adjusting the opening and the position of the aperture stop.

20 Claims, 6 Drawing Sheets

OPTICAL DEVICE FOR TESTING AN IMAGE SENSOR

TECHNICAL FIELD

The present invention relates to a field of an image sensor, and more particularly, an optical device for testing the image sensor.

BACKGROUND

Image sensors may convert incident light into electrical signals, and they are widely used for various kinds of consumer products. CCDs and CMOS image sensors are two main types of the image sensors. Cameras integrated in small consumer products generally use CMOS image sensors, which are usually cheaper and have lower power consumption. The CMOS image sensors dominate in still photography and consumer goods where overall cost is a major concern. Typically, the image sensor includes a light sensing array which has pixels configured in two-dimensions. Each pixel in the array works with lenses to respond to the incident light. Outputs from the pixels are converted to form raw data representing scenes. The raw data can be processed by a processor to produce digital images. Some CMOS image sensors use back-side illumination to increase the number of photons that hit the photodiode.

Generally, high-speed and cost-effective CMOS image sensors with good image quality are widely used in mobile handsets, smart-phones and digital cameras, however there is a growing demand for leading-edge, ultra-high-definition resolution products. The CMOS image sensor typically includes a pixel area and a logic area. In the pixel area, each pixel may include one photodiode and a plurality of pixel transistors. In the logic area, logic elements are configurated to process signals from the pixel area. The CMOS image sensor may have a structure in which the pixel area and the logic area are formed in respective chips, i.e., the chips are stacked in some examples. A stacked CMOS image sensor may provide high image quality through maximization of the number of pixels.

The lens module is required for imaging systems no matter what kind of the image sensor is. Currently, the lens module is small-size and is designed with wide angle of views, so that the total size of the optical system is kept compact and small to fit market demands. Various lenses may be used for different purposes. For example, zoom lenses are commonly used with smart phone, cameras and other optical instruments. Some photographic lenses are long-focus lenses, some are wide-angle lenses, and others cover a range from wide-angle to long-focus. Typically, it will be a big loss in many ways to find out the chip that doesn't work after it is packaged. As known in the art, the image sensor has to be test before it is assembled with the lens module. Therefore, once the chips are made on a wafer, a chip probing test (CP test) is employed with an electro-mechanical interface that allows testing the functioning of the die when it is still on the wafer. The probe card makes contact with the pads or bumps of the die during the CP testing. The purpose of the CP test is to screen out bad devices before packaging, so as to save the cost of packaging. Subsequently, a final test (FT) is performed before packaging the die. The FT is a full-functional test to ensure that the chips meet factory standards.

In the CP and FT sites, specific lens module is required for testing sensor optical performances, for example, uniformity, blemish etc., the specific lens module must match an active area (AA) and a chief ray angle (CRA) of the image sensor. The chief ray is a specific ray of light that originates from an object point and passes through an aperture stop, and it represents fundamental ray within the optical system and serves as a cornerstone for analyzing optical behavior. The chief ray angle defines the angular relationship between an optical axis and the chief ray of the lens module, it is crucial for optimal performance of the image sensor. The optical axis is the principal reference line within the optical system. The alignment of the chief ray angle is essential for achieving high-quality imaging. Proper considerations of the chief ray angle are necessary in the optical system to ensure compatibility and prevent defects in images captured by the image sensor. For example, in medical imaging considerations, especially in applications like endoscopes where space constraints are severe, the chief ray angle of the lens must be considered to ensure compatibility with the image sensor. Mismatched chief ray angle can result in undesirable defects in images, such as shadows or color mismatches.

In essence, the chief ray angle is a fundamental parameter in optical design. Its correct alignment is pivotal for achieving high-quality images and avoiding artifacts, making it a critical consideration in various imaging applications, from the consumer products to the medical applications. In practice, various types of lens modules are designed by different applications and clients, therefore, various specific probe cards and testing sockets are required to fit different lens specifications, the cost of the probe cards and testing sockets are dramatically increased. Over hundreds of lens models are required for the testing. However, the lens specifications are provided and designed by clients, and it is unlikely to alter or control the lens specifications which are important factors for correlation. On the other hand, it is impossible to design certain image sensors to fit each specific lens module.

What is desired is a novel scheme to solve the aforementioned issues.

SUMMARY OF THE INVENTION

In one aspect of the present invention, an optical device for testing an image sensor includes a first lens group arranged between a light-passing module and an object side. A second lens group is arranged between the light-passing module and the image sensor. In one embodiment, the light-passing control module is, disposed between the first lens group and the second lens group, configured to control amount of light incident based on a chief ray angle. The light-passing control module includes an aperture stop. The position of the aperture stop is adjustable along the optical axis of the optical device. Alternatively, the light-passing control module includes a rotating bezel with the aperture stop disposed inside.

In another aspect of the present invention, the light-passing control module includes a sub-module with the aperture stop that is replaceable at various positions along the optical axis between the first lens group and the second lens group. The position of the aperture stop is dependent on the chief ray angle of the optical device.

The chief ray angle of the optical device is changed by adjusting the position of the aperture stop inside the light-passing control module while keeping similar optical specifications. The optical specifications include F-number and field of view. The second lens group has a lens power 2 to 20 times of that of the first lens group. A ratio of maximum lens diameter (T) of the optical device to image height (D) of the image sensor, T/D, is in range of 2.0~2.4.

In yet another aspect, the aperture stop is disposed between the first lens group and the second lens group, and it is configured to change the chief ray angle of the optical device. The aperture stop is disposed inside a rotating bezel. In one embodiment, the chief ray angle of the optical device is changed through adjusting an opening and the position of the aperture stop while keeping similar optical specifications.

BRIEF DESCRIPTION OF THE DRAWINGS

The components, characteristics and advantages of the present invention may be understood by the detailed descriptions of the preferred embodiments outlined in the specification and the drawings attached.

DETAILED DESCRIPTION

Some preferred embodiments of the present invention will now be described in greater detail. However, it should be recognized that the preferred embodiments of the present invention are provided for illustration rather than limiting the present invention. In addition, the present invention can be practiced in a wide range of other embodiments besides those explicitly described, and the scope of the present invention is not expressly limited except as specified in the accompanying claims.

Figure 1:
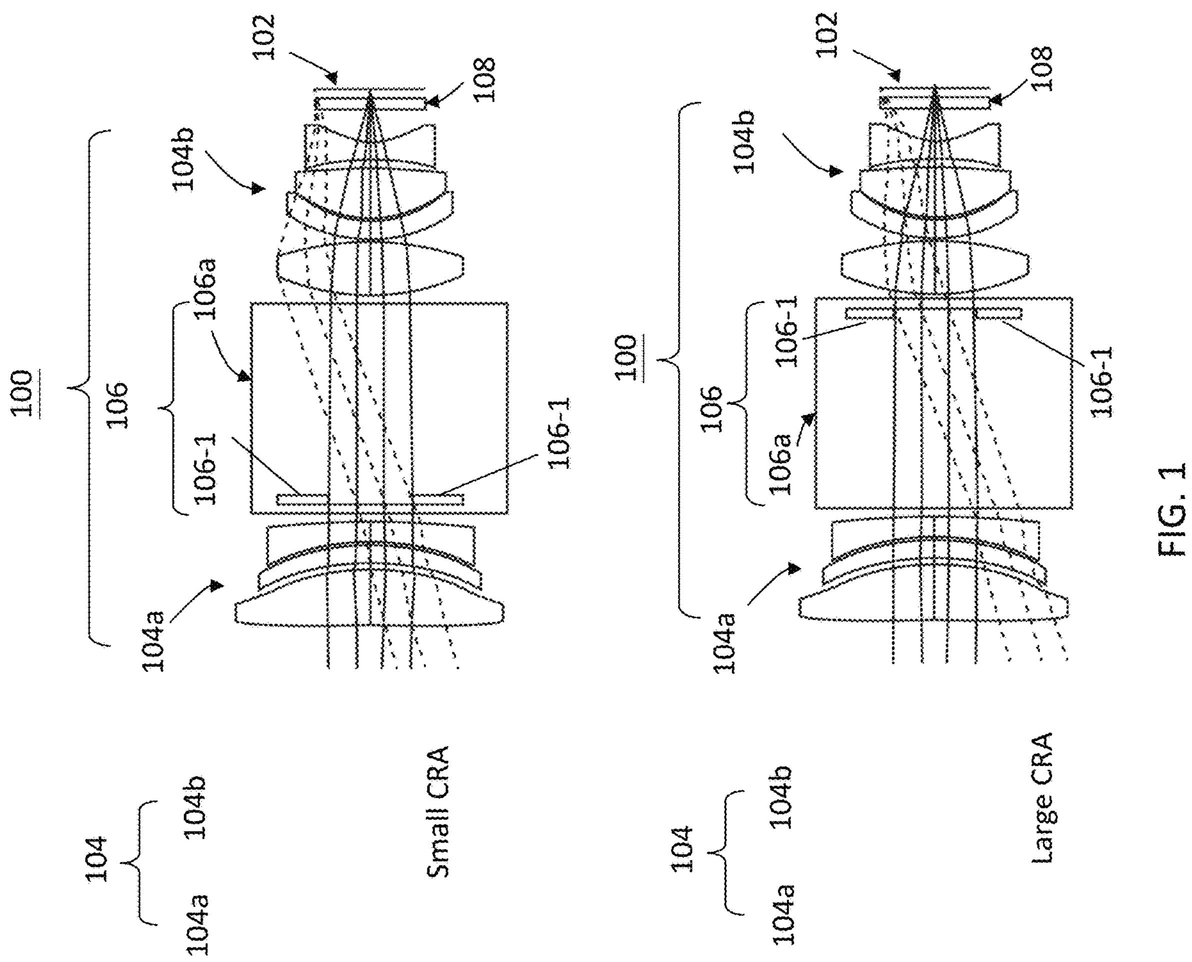
FIG. 1 shows an optical device for testing an image sensor according to one embodiment of the present invention.

The present invention discloses an optical device 100 for testing an image sensor 102 as shown in FIG. 1, which can be realized by placing a light-passing control module 106 between a first lens group 104*a* and a second lens group 104*b* of a lens module 104. FIG. 1 is a collection of cross-sectional diagrams of the optical device 100 for testing the image sensor 102. Please refer to FIG. 1, the optical device 100 includes the lens module 104, having the first lens group 104*a* and the second lens group 104*b*, and the light-passing control module 106 disposed there-between. In FIG. 1, both the first lens group 104*a* and the second lens group 104*b* have multiple lenses and are of positive lens power. In one of the embodiments, the lens power of the second lens group 104*b* is larger than that of the first lens group 104*a*, namely, the second lens group 104*b* has better ability to converge the light passing through than the first lens group 104*a*. The light-passing control module 106 is configured to control amount of light incident based on the CRA of the optical device 100. The CRA defines the angular relationship between the optical axis and the chief ray of the optical device 100. The CRA is crucial for optimal performance of the image sensor 102. In some embodiments, the image sensor 102 may include a complementary metal oxide semiconductor (CMOS) image sensor, a charge coupled device (CCD) image sensor, or the likes. In addition, an infrared filter (IR-filter) 108 may be disposed between the second lens group 104*b* and the image sensor 102 to reflect or block near-infrared wavelength while passing visible light. The light-passing control module 106 includes an aperture stop 106-1 and its position is adjustable along the optical axis of the optical device 100. The chief ray is the light ray from an off-axis point that goes through the center of the aperture stop 106-1, namely, one of the dashed lines that passes the center of the aperture stop 106-1.

The position of the aperture stop 106-1 is dependent on the CRA of the optical device 100. The aperture stop 106-1 is disposed in the sub-module 106*a* of the light-passing control module 106 as shown in the top figure of FIG. 1, the aperture stop 106-1 is placed closer to the first lens group 104*a* for small CRA. In this embodiment, the CRA is, for example, 4 degrees. Please refer to the bottom figure of FIG. 1, for large CRA, the aperture stop 106-1 is placed closer to the second lens group 104*b*. In this case, the CRA is, for example, 30 degrees. As a result, the aperture stop 106-1 is moveable between the first and the second lens groups 104*a*, 104*b*, and the optical specifications, such as F-number and field of view, of the optical device 100 are approximately constant while the aperture stop is adjusted, but the optical device 100 provides different CRA. From above, the aperture stop 106-1 can be utilized to change the CRA by adjusting the position of the aperture stop 106-1 between the first lens group 104*a* and the second lens group 104*b*. It means that the CRA can be changed while keeping similar optical specifications of the optical device 100.

Figure 2:
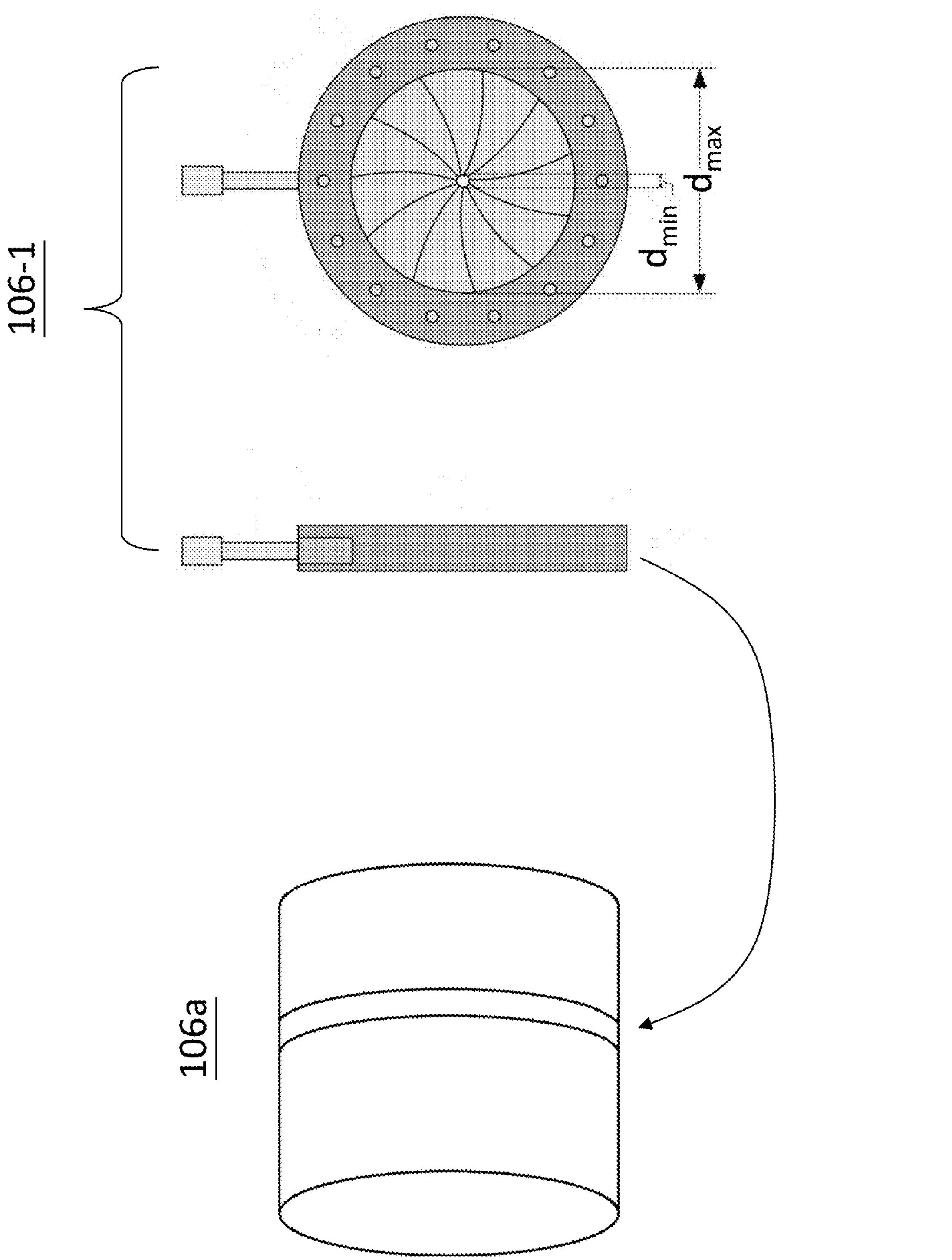
FIG. 2 illustrates a schematic diagram of the light-passing control module according to one embodiment of the present invention.

Please refer to FIG. 2, the aperture stop 106-1 is replaceable at various positions along the optical axis between the first and the second lens groups 104*a*, 104*b*. FIG. 2 shows the front and the side views of the aperture stop 106-1. It shows that the aperture stop 106-1 can be designed in form of iris diaphragms with an opening at the center, and the opening can be adjusted continuously from largest ($d_{max}$) to smallest ($d_{min}$) dimension. The aperture stop 106-1 determines the amount of light reaching the image sensor 102.

In an alternative embodiment, the light-passing control module 106 may include a rotating bezel with the aperture stop 106-1 installed inside (not shown), the position of the aperture stop 106-1 can be altered continuously while rotating the rotating bezel.

From above embodiment, the CRA is increased when the aperture stop 106-1 is moved toward to the second lens group 104*b*, and the optical specifications of the optical device 100 can be kept, simultaneously. Apparently, the present invention may overcome the shortcomings of the prior arts. In order to further elucidate the aforementioned embodiments, four exemplary optical devices 100 are respectively shown in FIGS. 3A-3D. Some key features of these four exemplary optical devices 100 are listed in Table 1. Four workable CRA ranges with respect to these exemplary optical devices 100 are also shown. These examples show that the present invention may fit any optical devices 100 with different lens type and lens number.

TABLE 1

| | Example 1 | Example 2 | Example 3 | Example 4 |
|---|---|---|---|---|
| Lens module | 5P | 2P5G | 2P5G | 2P6G |
| Divided group | 3 | 3 | 3 | 3 |
| CRA range | 5~30 degrees | 4~30 degrees | 4~30 degrees | 10~30 degrees |
| FOV | 28 degrees | 37 degrees | 32 degrees | 31 degrees |
| F-number | 2.0 | 2.0 | 2.0 | 2.0 |
| Dimension | Φ 16 × 28 mm | Φ 14 × 28 mm | Φ 14 × 33 mm | Φ 14 × 34 mm |

In Table 1, four exemplary lens modules 104 (example 1~ example 4) are listed, each corresponding to the optical device 100 illustrated in FIGS. 3A, 3B, 3C and 3D. These four exemplary lens modules 104 have different optical specifications and dimensions. Each of the optical device 100 includes three divided groups, namely, the first lens group 104*a*, the second lens group 104*b* and the light-passing control module 106. The lens type and lens number are not critical in the invention, the lens type and lens number of these embodiments are used for the purpose of illustrations only, not for limiting the scope of the present invention. Please refer to example 1 and FIG. 3A, the 5P represents that the lens module 104 includes total five plastic lenses. For examples 2 and 3 (please refer to FIGS. 3B-3C), 2P5G represents two plastic lenses and five glass lenses. Similarly, for example 4 (please refer to FIG. 3D), 2P6G represents that the lens module 104 includes two plastic and six glass lenses. As aforementioned, the lens number and lens type are used for illustration only.

The specifications of these lens modules 104 can be found in Table 1. For instance, the CRA of the lens module 104 (example 1) is 5 to 30 degrees, maximum lens diameter 16 mm and total length 28 mm are indicated by Φ16×28 mm, the field of view (FOV) is 28 degrees and the F-number is 2.0. These optical parameters of the examples 2-4 are all shown in Table 1 as well. Therefore, the redundancy descriptions are omitted. In some embodiments, the ratio of the maximum lens diameter (T) of the optical device 100 to the image height (D) of the image sensor 102, T/D, is in range of 2.0 to 2.4.

Figure 3A:
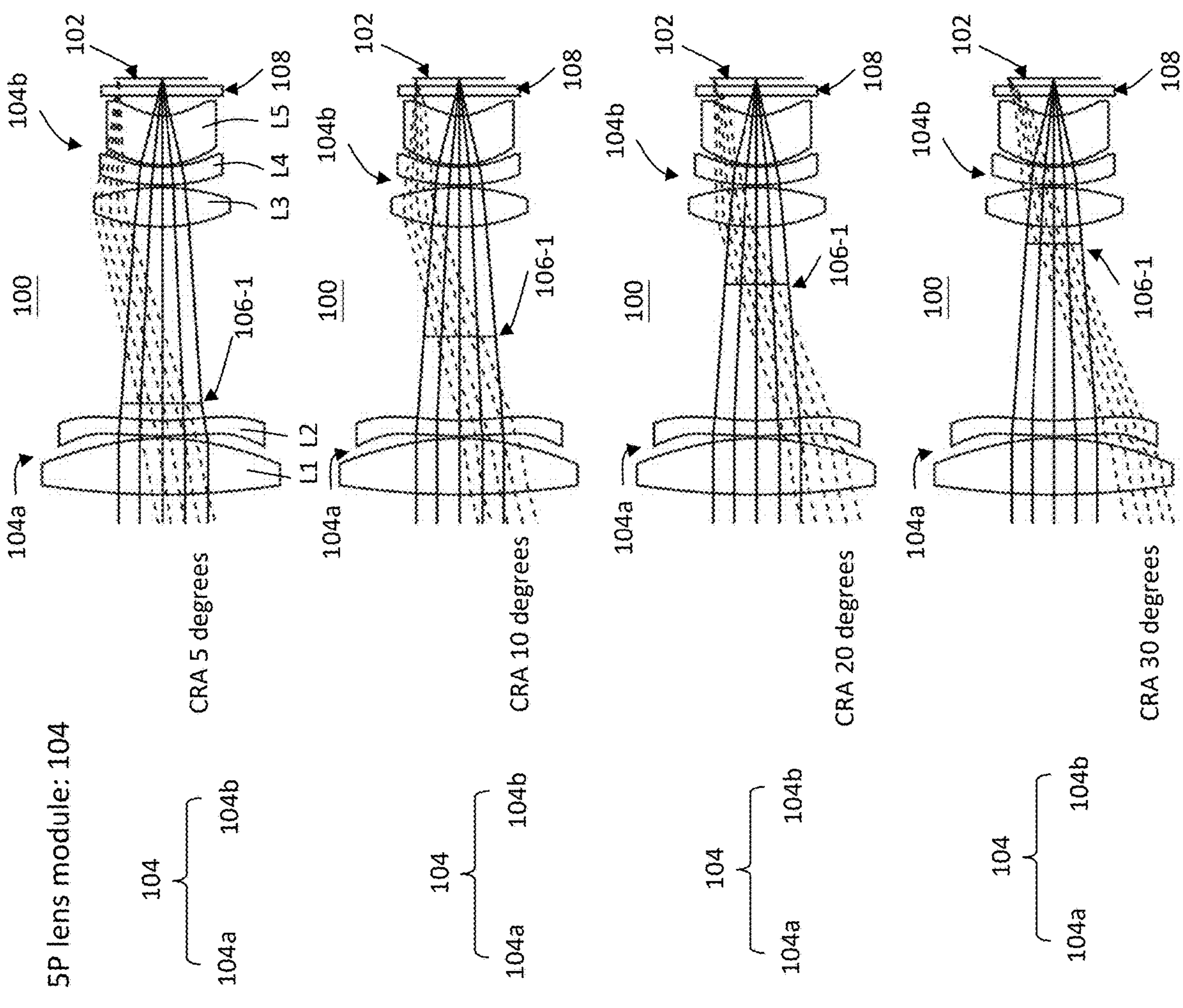
FIG. 3A shows an optical device having different CRA for testing an image sensor according to example 1 of the present invention.

FIG. 3A shows the optical device 100 according to example 1. The optical device 100 includes lenses from left to right, L1, L2, L3, L4 and L5, where the first lens group 104*a* includes the lenses L1 and L2, and the second lens group 104*b* includes the lenses L3, L4 and L5. The aperture stop 106-1 is disposed between the first lens group 104*a* and the second lens group 104*b*. In the embodiment, the aperture stop 106-1 is disposed between the lens L2 and the lens L3. In FIG. 3A, each optical device 100 provides CRA of 5 degrees, 10 degrees, 20 degrees or 30 degrees, respectively.

In the case that the optical device 100 provides CRA of 5 degrees (the top one), the aperture stop 106-1 is disposed closest to the first lens group 104*a*, it enables the optical device 100 to output the CRA for matching the image sensor 102. For the optical device 100 that provides CRA of 10, 20 and 30 degrees, the position of the aperture stop 106-1 is changed toward to the second lens group 104*b*. Similarly, the output CRAs match the image sensor 102. From above embodiment, the aperture stop 106-1 is moved and the CRA is changed accordingly, while keeping the optical specifications of the optical device 100.

Please refer to Table 2, the positions of the aperture stop 106-1 for various CRAs are shown. Surface numbers are sequentially increased from the object side to the image side (from left to right). In the exemplary case, surface S4 represents the surface number of the second lens L2, from the first lens group 104*a*, the surface S4 is the closest surface to the aperture stop 106-1. Surface S5 indicates the surface number of the third lens L3, from the second lens group 104*b*, the surface S5 is closest to the aperture stop 106-1. The distance from the aperture stop 106-1 to the second lens L2 (the third lensL3) is shown in the column S4 (S5) in Table 2. In the case of 5 degrees CRA, the aperture stop 106-1 is disposed at the position that is 1.2 mm apart from the lens L2, and is 11.8 mm apart from the lens L3. For other cases, the position of the aperture stop 106-1 can be interpreted from Table 2.

TABLE 2

| | S4 | S5 |
|---|---|---|
| CRA 5 degrees | 1.2 | 11.8 |
| CRA 10 degrees | 5.6 | 7.4 |
| CRA 20 degrees | 9.2 | 3.8 |
| CRA 30 degrees | 11.9 | 1.1 |

Figure 3B:
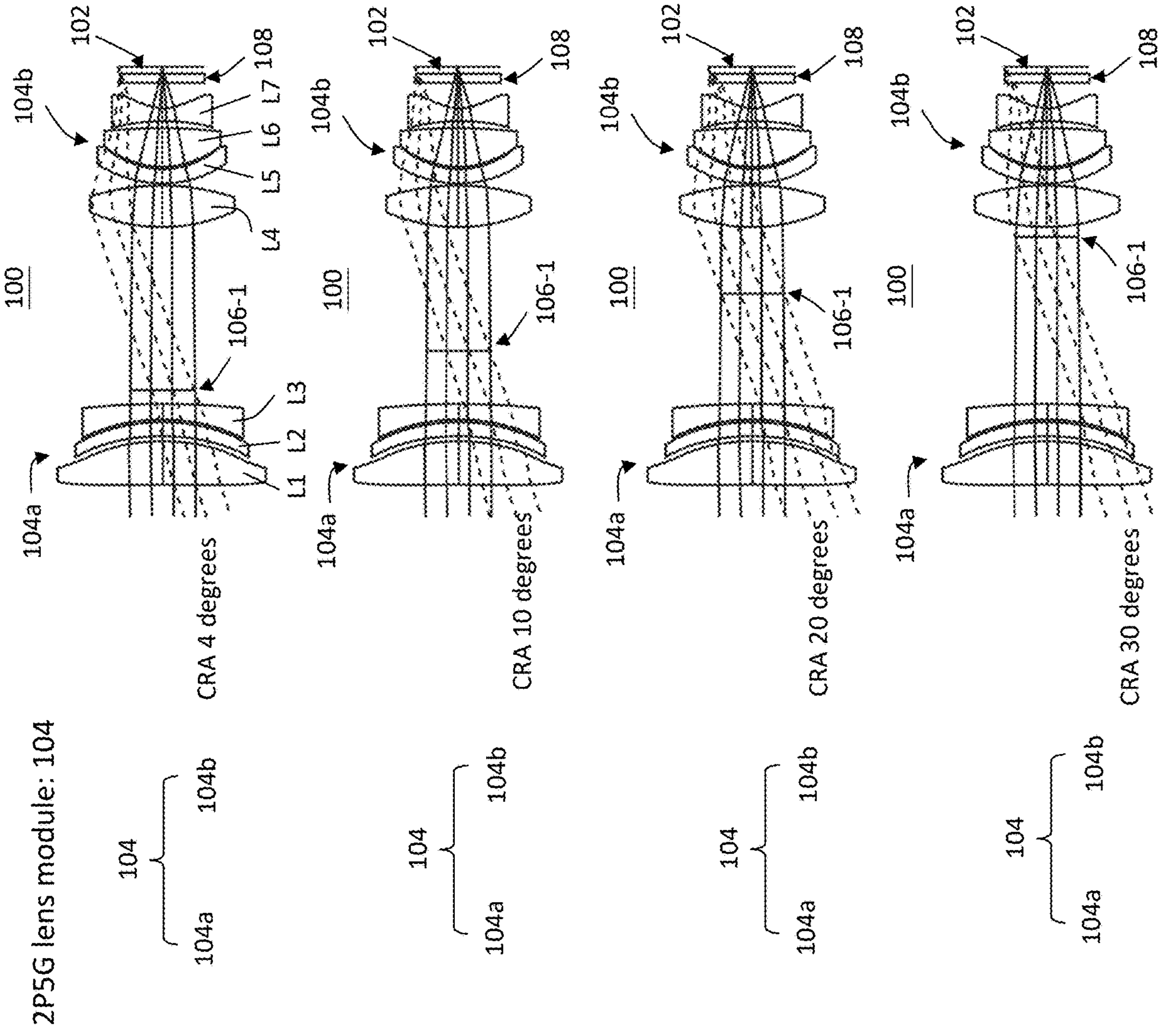
FIG. 3B shows an optical device having different CRA for testing an image sensor according to example 2.
Figure 3C:
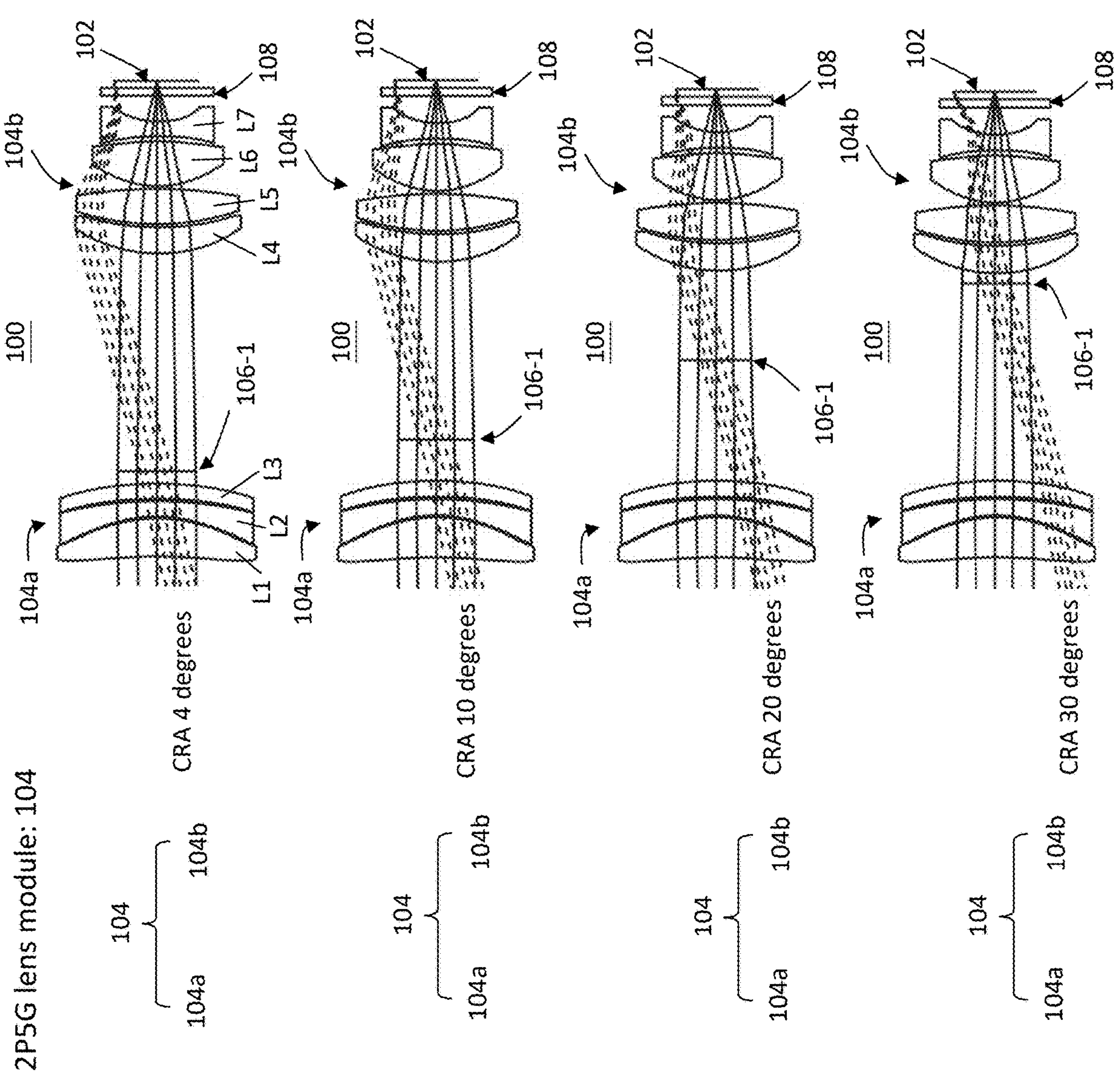
FIG. 3C shows an optical device having different CRA for testing an image sensor according to example 3.
Figure 3D:
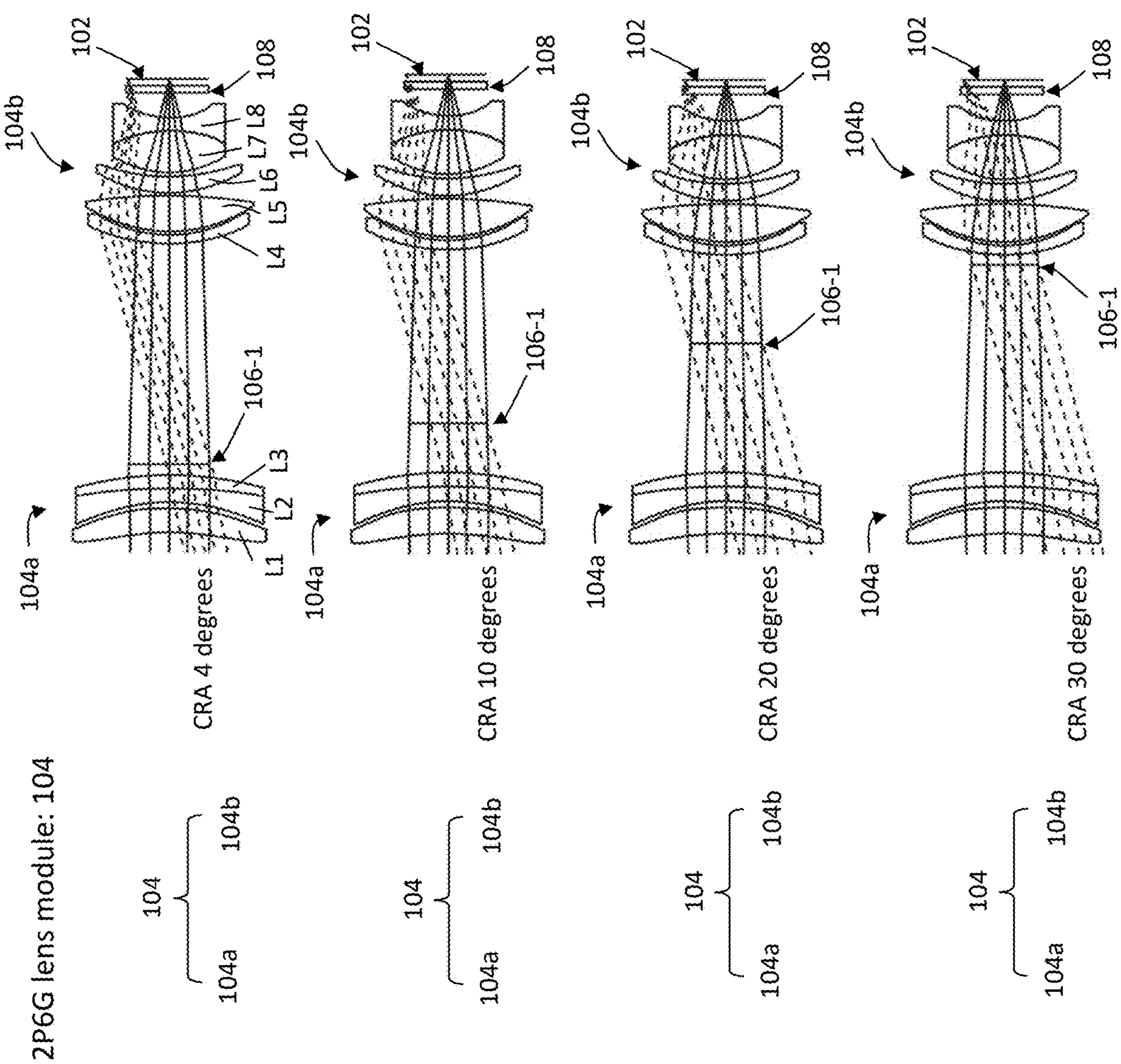
FIG. 3D shows an optical device having different CRA for testing an image sensor according to example 4.

FIGS. 3B-3D show cross-sectional diagrams according to examples 2-4. Similarly, the L1, L2, . . . , L6 and L7 indicate the lenses from left to right. Similar to example 1, each optical device 100 provides CRA of 4 degrees, 10 degrees, 20 degrees or 30 degrees. In order to output the CRA matching the image sensor 102, the dependence between the positions of the aperture stop 106-1 and the CRA behaves similarly as that of example 1. The aperture stop 106-1 is disposed closer to the first lens group 104*a* for small CRA, while the aperture stop 106-1 is located closer to the second lens group 104*b* for large CRA. Other similar details are described in the previous examples. Therefore, the redundancy descriptions are omitted herein.

For examples 2-4, the positions of the aperture stop 106-1 for various CRAs of the optical device 100 are shown in Tables 3-5. In Table 3, surface S6 represents the surface number of the third lens L3, from the first lens group 104*a*, the surface S6 is the closest surface to the aperture stop 106-1. Surface S7 represents the surface number of the fourth lens L4, from the second lens group 104*b*, surface S7 is the closest surface to the aperture stop 106-1. In Table 3, the distance from the aperture stop 106-1 to the third lens L3 (the fourth lens L4) is shown in the column S6 (S7). In the case of 4 degrees CRA (top figure), the aperture stop 106-1 is disposed at the position that is 1.0 mm apart from the lens L3 and is 11.0 mm apart from the lens L4. For other cases, the position of the aperture stop 106-1 can be interpreted from the data shown in Table 3.

TABLE 3

| | S6 | S7 |
|---|---|---|
| CRA 4 degrees | 1 | 11 |
| CRA 10 degrees | 3.6 | 8.4 |
| CRA 20 degrees | 7.5 | 4.5 |
| CRA 30 degrees | 11.2 | 0.8 |

FIG. 3C-3D show the diagrams of examples 3-4. Each optical device 100 provides CRA of 4 degrees, 10 degrees, 20 degrees or 30 degrees, respectively. Table 4 and Table 5 both show the distance of the aperture stop 106-1 apart from the lens L3 and L4. The specific characteristics and principle referring to the embodiments are not repeated herein. Please refer to the previous example 1 and FIG. 3A.

TABLE 4

| | S6 | S7 |
|---|---|---|
| CRA 4 degrees | 0.8 | 15.7 |
| CRA 10 degrees | 2.8 | 12.1 |
| CRA 20 degrees | 8 | 6.2 |
| CRA 30 degrees | 13.6 | 0.5 |

TABLE 5

| | S5 | S6 |
|---|---|---|
| CRA 10 degrees | 3.3 | 12.5 |
| CRA 20 degrees | 9.1 | 6.3 |
| CRA 30 degrees | 14.8 | 0.5 |

According to the examples illustrated in FIGS. 3A-3B, the first lens group 104*a* may include two or three lenses and at least one lens is an aspheric lens (the first aspheric lens), while the second lens 104*b* group may include three or four or five lenses and at least one of these lenses is an aspheric lens (the second aspheric lens). The present invention solves the issue of low correlation between different sensor model and lens module by utilizing the lens module with similar dimension and optical specification but having different CRA.

While various embodiments of the present invention have been described above, it should be understood that they have been presented by a way of example and not limitation. Numerous modifications and variations within the scope of the invention are possible. The present invention should only be defined in accordance with the following claims.

What is claimed is:

1. An optical device for testing an image sensor, comprising:

a first lens group arranged between a light-passing control module and an object side;

a second lens group arranged between said light-passing control module and said image sensor;

wherein said light-passing control module is disposed between said first lens group and said second lens group, configured to control an amount of light incident based on a chief ray angle; and wherein said first lens group and said second lens group include a positive lens power, wherein said light-passing control module includes an aperture stop, a position of said aperture stop being dependent on said chief ray angle, said aperture stop being placed closer to said first lens group for a first chief ray angle, said aperture stop being placed closer to said second lens group for a second chief ray angle, wherein said first chief ray angle is smaller than said second chief ray angle.

2. The optical device of claim 1, wherein said position of said aperture stop is adjustable along an optical axis of said optical device.

3. The optical device of claim 2, wherein said light-passing control module includes a rotating bezel with said aperture stop disposed inside.

4. The optical device of claim 2, wherein said light-passing control module includes a sub-module with said aperture stop being replaceable at various positions along said optical axis between said first lens group and said second lens group.

5. The optical device of claim 2, wherein said position of said aperture stop is dependent on said chief ray angle of said optical device.

6. The optical device of claim 5, wherein said chief ray angle of said optical device is changed through adjusting said position of said aperture stop inside said light-passing control module, wherein optical specifications of said optical device are approximately constant while said aperture stop is adjusted.

7. The optical device of claim 6, wherein said optical specifications include a F-number and a field of view.

8. The optical device of claim 1, wherein said second lens group has a lens power 2 to 20 times of that of said first lens group.

9. The optical device of claim 1, wherein at least one lens of said first lens group is a first aspheric lens, wherein at least one lens of said second lens group is a second aspheric lens.

10. The optical device of claim 1, wherein a ratio of a maximum lens diameter (T) of said optical device to an image height (D) of said image sensor, T/D, is in range of 2.0~2.4.

11. An optical device for testing an image sensor, comprising:

a first lens group arranged between an aperture stop and an object side;

a second lens group arranged between said aperture stop and said image sensor;

wherein said aperture stop is disposed between said first lens group and said second lens group and is configured to change a chief ray angle of said optical device; and wherein said first lens group and said second lens group include a positive lens power, wherein a position of said aperture stop being dependent on said chief ray angle, said aperture stop being placed closer to said first lens group for a first chief ray angle, said aperture stop being placed closer to said second lens group for a second chief ray angle, wherein said first chief ray angle is smaller than said second chief ray angle.

12. The optical device of claim 11, wherein a said position of said aperture stop is variable along an optical axis of said optical device.

13. The optical device of claim 12, wherein said aperture stop is disposed inside a rotating bezel.

14. The optical device of claim 12, wherein said aperture stop is disposed in a sub-module being replaceable at various positions along said optical axis between said first lens group and said second lens group.

15. The optical device of claim 12, where said chief ray angle of said optical device is changed through adjusting an opening and said position of said aperture stop, wherein optical specifications of said optical device are approximately constant while said aperture stop is adjusted.

16. The optical device of claim 15, wherein said optical specifications include a F-number and a field of view.

17. The optical device of claim 11, wherein said second lens group has a lens power 2 to 20 times of that of said first lens group.

18. The optical device of claim 11, wherein said first lens group includes two or three lenses and at least one of said lenses is a first aspheric lens.

19. The optical device of claim 11, wherein said second lens group includes three or four or five lenses and at least one of said lenses is a second aspheric lens.

20. The optical device of claim 11, wherein a ratio of a maximum lens diameter (T) of said optical device to an image height (D) of said image sensor is in range of 2.0~2.4.

* * * * *